Patented July 23, 1946

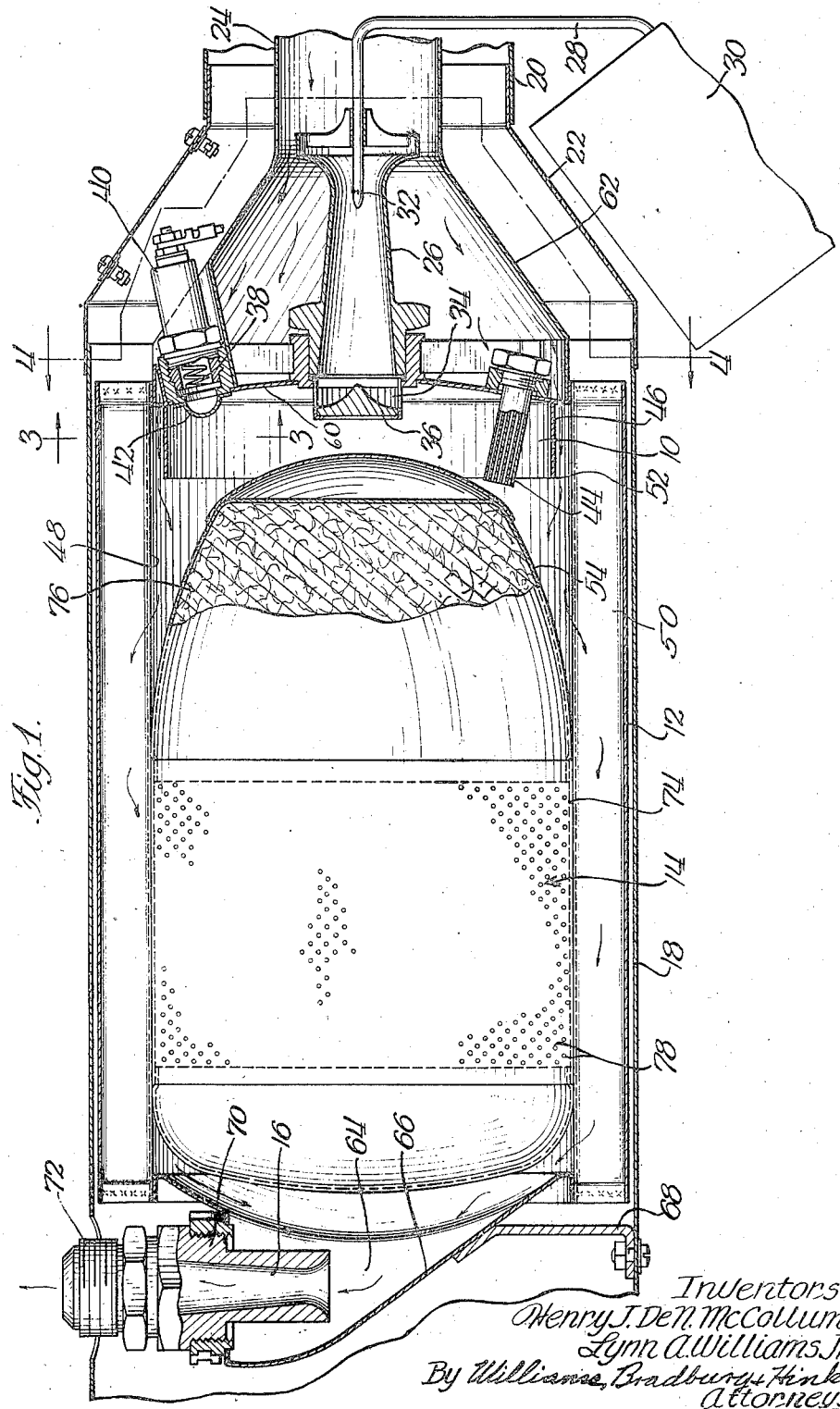

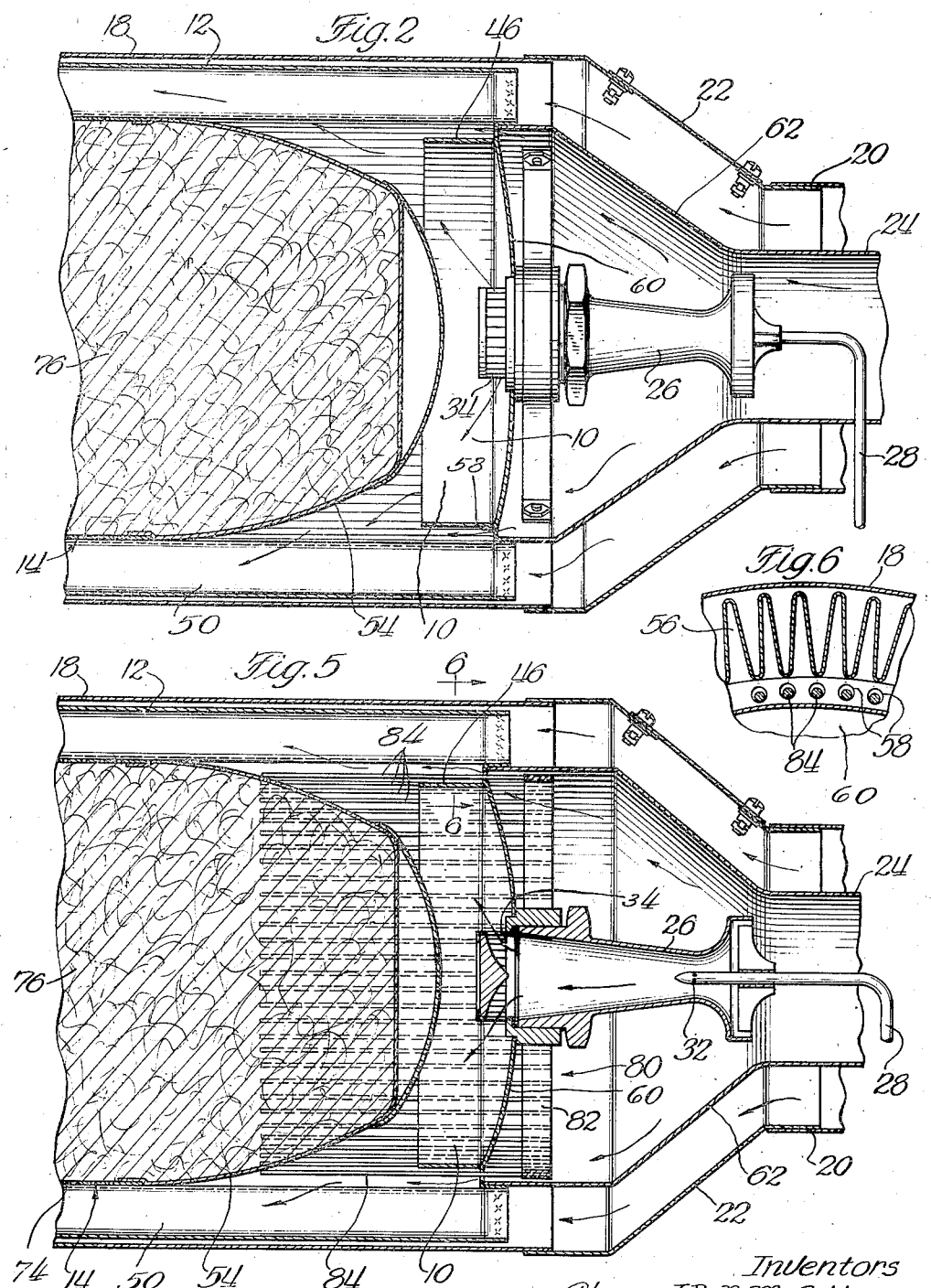

2,404,647

UNITED STATES PATENT OFFICE 2,404,647

HEATING APPARATUS

Henry J. De N. McCollum and Lynn A. Williams, Jr., Chicago, Ill.; said Williams assignor to Stewart-Warner Corporation, Chicago, Ill., a corporation of Virginia; Thelma McCollum executrix of said Henry J. De N. McCollum, deceased Application October 15, 1942, Serial No. 462,074

8 Claims. (Cl. 126—116)

Our invention relates to heating apparatus and more particularly to heaters of the internal combustion type particularly adapted for, but not limited to, use in aircraft.

In heaters of the internal combustion type, it is common to provide finned heat transfer means for transferring heat from the products of combustion to the ventilating air directed over the heat transfer means by a ram or blower for circulating air. The heated products of combustion are originally directed against the fins at one end of the heat transfer means and where the hot products of combustion first come in contact with the fins, these fins are raised to a temperature which is much in excess of the temperature of other portions of the fins and particularly that portion adjacent the outlet end of the heater. There is a practical limit to the temperature to which the fins can be heated and this limits the total quantity of heat which can be given off by a heater of any given size and shape.

An object of our invention is to provide heating apparatus of the internal combustion type in which local hot spots are eliminated and the heat transfer means is heated to a substantially uniform temperature throughout its length.

Another object of our invention is to provide heating apparatus wherein the temperature range between different parts of the heat transfer means is reduced to a minimum and stresses and strains caused by great variations in temperature of different portions of the heat transfer means are avoided.

Another object of our invention is to provide new and improved heating apparatus which is extremely light in weight and compact and has a high heating output.

Other objects and advantages will become apparent as the description proceeds.

In the drawings:

Fig. 1 is a longitudinal, sectional view of a preferred embodiment of our invention;

Fig. 2 is a partial, sectional view taken in the plane of the line 2—2 of Fig. 4;

Fig. 5 is a vertical, sectional view of the inlet end of a heater embodying a modified form of our invention; and Fig. 6 is a partial, vertical, sectional view taken on the line 6—6 of Fig. 5.

Figure 4:
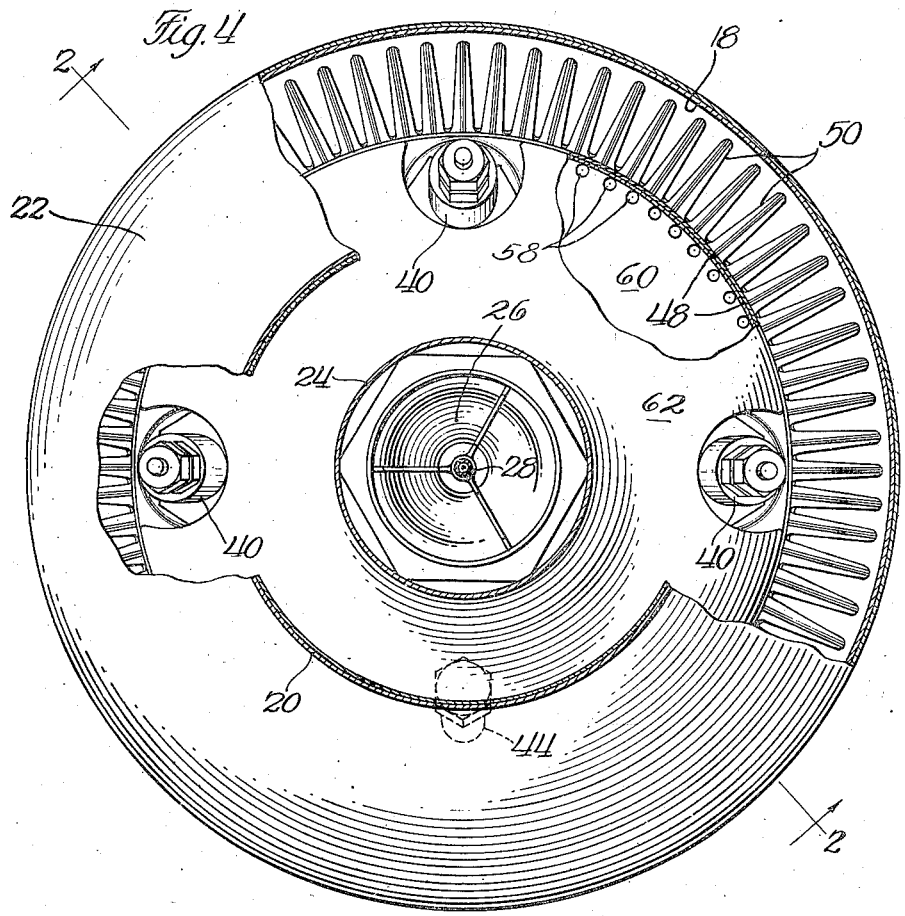
Fig. 4 is an irregular, sectional view taken on the line 4—4 of Fig. 1.
Figure 3:
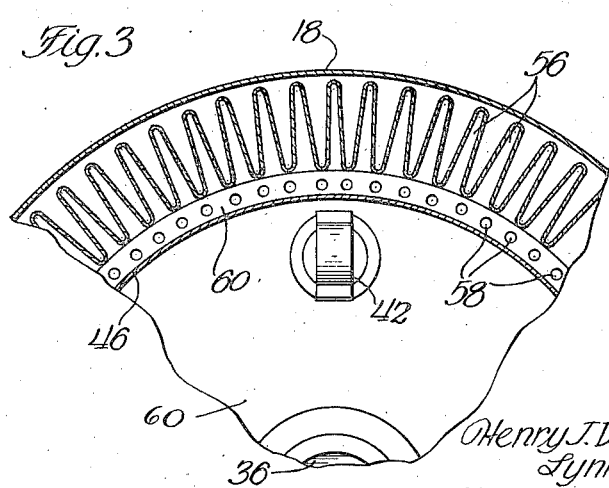
Fig. 3 is a partial, vertical, sectional view taken on the line 3—3 of Fig. 1.

The heating apparatus shown in Figs. 1 to 4, inclusive, comprises, in general, a combustion chamber 10, a finned heat exchanger 12 having a muffler 14 located therein, and an outlet 16 through which the cooled products of combustion are discharged to atmosphere. The heat exchanger 12 is enclosed in a cylindrical casing 18 through which ventilating air is directed by a ram or blower at the inlet end of the duct 20 which supplies the ventilating air to the tapered inlet 22 of the casing 18. The heated ventilating air discharged from the lefthand end of the casing 18 may flow directly into the aircraft cabin or other space to be heated, or may be distributed to selected locations through a series of ventilating ducts, as desired.

A separate ram or blower forces air into the inlet end of a pipe 24, leading to a Venturi tube 26, which receives part of the air flowing through the pipe 24. A rich mixture of fuel and air is supplied to the throat of the Venturi tube 26 by a pipe 28 connected to a primary carburetor 30. The pipe 28 has outlet openings 32 through which the rich mixture of fuel and air formed in the primary carburetor 30 passes into the Venturi tube 26 and mixes with the air flowing therethrough to form a combustible mixture.

This combustible mixture is discharged with a whirling motion through openings 34 in burner tube 36 and is initially ignited by the hot wires 38 of igniters 40. The igniters are provided with shields 42 which are open to the combustion chamber at each end, but which serve to protect the hot wires 38 against the direct discharge of combustible mixture through the openings in the burner tube 36. In the particular embodiment disclosed, three igniters are provided and these igniters are arranged about the combustion chamber as most clearly shown in Fig. 4. It is understood, however, that any desired number and arrangement of igniters may be utilized and the particular number and arrangement shown is not essential.

It will be understood that the igniters 40 are controlled by the usual thermostatic switch for disconnecting these igniters from their source of electrical current when the heater attains normal operating temperature and thereafter ignition of the incoming combustible mixture is maintained by the re-igniter 44. Only a single re-igniter is shown, as ordinarily a single re-igniter is sufficient to maintain combustion of the incoming fuel, but additional re-igniters may be provided if desired. The single re-igniter is illustrated as being located at the lower end of the combustion chamber and such location is desirable but not essential.

The combustion chamber 10 has an annular wall 46 which is spaced inwardly of the bases 48 of the hollow fins 50. The hot products of combustion flow between the lefthand end 52 of the annular wall 46 and the tapered end 54 of the muffler into the gas passages 56 extending lengthwise of the hollow fins. The tapered end of the muffler provides a tapering annular passageway for the products of combustion and permits these hot gases to make their initial contact with the hollow fins over an appreciable portion of the entire length of these fins. This tends to reduce the formation of hot spots in the bases of the fins, but we have found it desirable to provide additional means for eliminating such hot spots and for maintaining the finned heat exchanger 12 at a more uniform temperature throughout its length.

In the embodiment of Figs. 1 to 4, inclusive, this additional means for eliminating hot spots from the bases of the hollow fins comprises the provision of an annular series of inlet openings 58 in the wall 60 which connects the combustion chamber with the inlet end of the heat exchanger 12. As most clearly shown in Figs. 3 and 4, each inlet opening is located immediately beneath the base 48 of a hollow fin. These inlet openings 58 communicate with the interior of the conical extension 62 of the pipe 24 and are supplied with air by the same blower or ram which supplies the secondary air for the combustible mixture. The air passing through the inlet openings 58 flows lengthwise of the bases of the hollow fins and cools the bases of these fins adjacent their inlet ends sufficiently to prevent the creation of hot spots in these bases where the hot products of combustion first come in contact with the fins.

The cooling air admitted through the inlet openings 58 is not intended to promote additional combustion adjacent the bases of the fins, but is admitted solely for the purpose of cooling these bases adjacent the inlet end of the heat exchanger. This cooling air mixes with the products of combustion and this mixture flows lengthwise of the hollow fins from whence it passes into the chamber 64 formed between the lefthand end of the muffler 14 and a plate 66 which closes the lefthand end of the heat exchanger 12. One or more brackets 68 may be provided to attach the plate 66 to the casing 18.

The outlet 16 is formed in a fitting 70 mounted on the plate 66 and having a threaded end 72 for attachment to an exhaust pipe communicating with atmosphere. In some installations the fitting 70 may be connected to the inlet of a suction blower or other suction producing means where it is desired to utilize such suction producing means to create the necessary flow of combustible mixture into the heater and of the products of combustion therefrom. The flow of ventilating air through the casing 18 may also be caused by suction producing means connected to the outlet end of this casing rather than by pressure producing means at the inlet of the pipe 20 where such an alternative arrangement is preferred.

The muffler 14 has a sheet metal shell 74 which is filled with sound absorbing and heat resisting material 76 such, for example, as glass wool or stainless steel wool. The shell 74 is provided with a plurality of small perforations 78 which form acoustic couplings between the gas passages in the hollow fins and the interior of the muffler.

In the modification of Figs. 5 and 6, we have provided further means in addition to the inlet openings 58 for preventing the creation of hot spots in the bases of the fins where the hot products of combustion first engaged these fins. This further means is illustrated as comprising a comb 80 having an annular base 82 provided with teeth 84 which project through the inlet openings 58 and lie parallel to the bases of the fins.

The comb 80 is preferably made of copper or other material having high heat conductivity. The teeth 84 are of smaller diameter than the openings 58 and permit cooling air to enter these openings and flow lengthwise of the teeth 84 and the bases of the hollow fins. The teeth 84 are preferably made of such length that they extend for substantially the entire length of that portion of the hollow fins which first comes in contact with the hot products of combustion and serve to prevent the formation of local hot spots throughout this portion of the hollow fins.

The comb 80 may be either a complete annulus or may be composed of a plurality of arcuate segments. In the embodiment shown in the drawings, frictional engagement between the teeth 84 and the sides of inlet openings 58 is relied upon to hold the comb in place, but any desired means may be provided for attaching the comb to the conical air conduit 62, or any other suitable part of the heating apparatus.

Our novel heating apparatus is highly efficient since the heat exchanger is maintained at a substantially uniform temperature throughout its length and this uniform temperature may be the maximum permissible temperature for efficient operation. This heating apparatus can be made extremely compact and of lightweight construction and is particularly suitable for use in aircraft. It is not limited to such use, however, and may be utilized for various other purposes. While our novel means for eliminating hot spots from the finned heat exchanger is particularly advantageous in heating apparatus having its own combustion chamber, our improvement is not necessarily limited to such use but may find application in exhaust type heaters or other heaters where hot fluid is supplied from outside sources.

While we have illustrated and described herein only two embodiments of our invention, it is to be understood that our invention is not limited to the details shown and described, but may assume numerous other forms and is to be construed as including all variations and modifications falling within the scope of the appended claims.

We claim:

1. Heating apparatus comprising a tubular heat exchanger of the hollow finned type, means forming a combustion chamber in one end thereof for supplying hot products of combustion to the interior of said heat exchanger, means for directing cooling air into said heat exchanger at the combustion chamber end thereof, and a plurality of parallel rods adjacent the bases of said fins to prevent the formation of hot spots in the bases of the hollow fins where the hot products of combustion first contact these fins, said rods having parts in contact with said cooling air.

2. Heating apparatus of the class described, comprising a tubular heat exchanger of the hollow finned type, means for supplying hot fluid to one end of said heat exchanger and interiorly thereof, means for forming a blanket of cooling fluid between the hot fluid and the bases of the fins adjacent said end of the heat exchanger, and heat dissipating members in the path of said cooling fluid and inwardly of the bases of said fins, said members having parts extending beyond said heat exchanger.

3. In heating apparatus of the class described, the combination of a tubular heat exchanger of the finned type, means forming a combustion chamber located in one end of said heat exchanger and supplying hot products of combustion thereto, said combustion chamber having an annular wall spaced from said heat exchanger, a carburetor for supplying a combustible mixture to said combustion chamber, means for supplying air to said carburetor, an annular series of inlet openings for supplying air to the annular space between said combustion chamber and heat exchanger, each of said openings being located inwardly of the base of a fin, said openings being supplied with air by the means supplying air to the carburetor, and other means for directing ventilating air over said heat exchanger.

4. In heating apparatus of the class described, the combination of a tubular heat exchanger of the finned type, means forming a combustion chamber located in one end of said heat exchanger and supplying hot products of combustion thereto, said combustion chamber having an annular wall spaced from said heat exchanger, means for supplying a combustible mixture to said combustion chamber, an annular series of inlet openings for supplying air to the annular space between said combustion chamber and heat exchanger, each of said openings being located inwardly of the base of a fin, said openings being supplied with air by part of said first means, and second means for directing ventilating air over said heat exchanger.

5. Heating apparatus of the class described, comprising a tubular heat exchanger having hollow fins provided with bases, means forming a combustion chamber for supplying hot products of combustion to one end of said heat exchanger, a muffler located in said heat exchanger and cooperating therewith to direct the products of combustion lengthwise of the interiors of said hollow fins, means for supplying a combustible mixture to said combustion chamber, means for directing ventilating air over said heat exchanger, and a heat dissipating comb having teeth extending parallel to the base of said fins adjacent the combustion chamber end thereof, said comb having a part exposed to said ventilating air.

6. Heating apparatus of the class described, comprising a tubular heat exchanger having hollow fins provided with bases, means forming a combustion chamber for supplying hot products of combustion to one end of said heat exchanger, a muffler located in said heat exchanger and cooperating therewith to direct the products of combustion lengthwise of the interiors of said hollow fins, means for supplying a combustible mixture to said combustion chamber, means for directing ventilating air over said heat exchanger, a heat dissipating comb having teeth extending parallel to the base of said fins adjacent the combustion chamber end thereof, and means for directing cooling fluid against said comb.

7. In heating apparatus of the class described, the combination of a tubular heat exchanger of the finned type, means forming a combustion chamber located in one end of said heat exchanger and supplying hot products of combustion thereto, said combustion chamber having an annular wall spaced from said heat exchanger, means for supplying a combustible mixture to said combustion chamber, an annular series of inlet openings for supplying air to the annular space between said combustion chamber and heat exchanger, each of said openings being located inwardly of the base of a fin, said openings being supplied with air by said first means, a comb having teeth extending through said openings and a part exposed to said air, and second means for directing ventilating air over said heat exchanger.

8. A heating apparatus of the class described comprising a tubular heat exchanger of the hollow finned type, wall means forming a combustion chamber at the rear end of the heat exchanger for supplying hot products of combustion to the interior of the heat exchanger, means comprising a conduit for directing a supply of combustion air into said combustion chamber and a separate supply of cooling air into said heat exchanger by a path which leads said air over the outer surface of said wall means of said combustion chamber and against the portions of the fins adjacent the combustion chamber, and other means for directing a supply of ventilating air over the exterior of said heat exchanger.

HENRY J. DE N. McCOLLUM.
LYNN A. WILLIAMS, Jr.